Feb. 18, 1930.    B. D. RITHOLZ    1,747,844
EYE TESTING DEVICE
Filed April 16, 1927
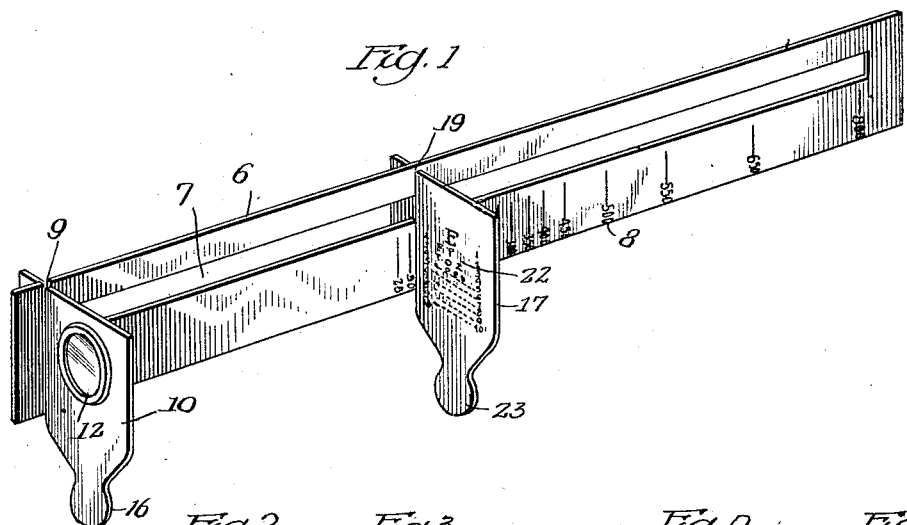
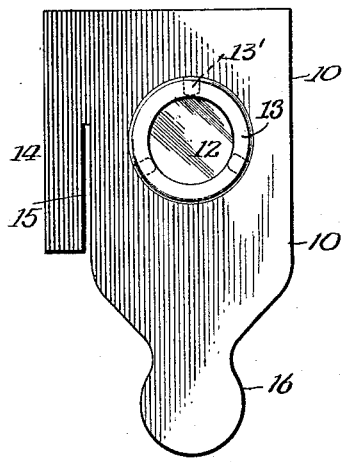
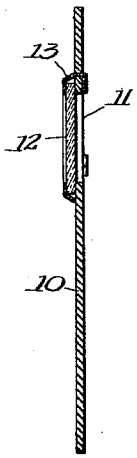
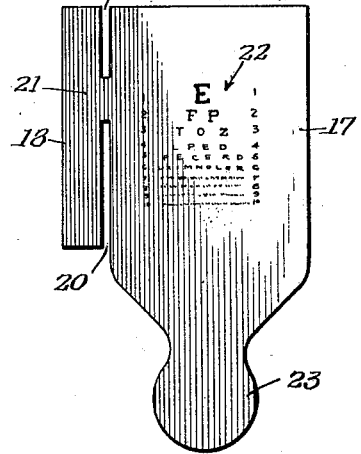
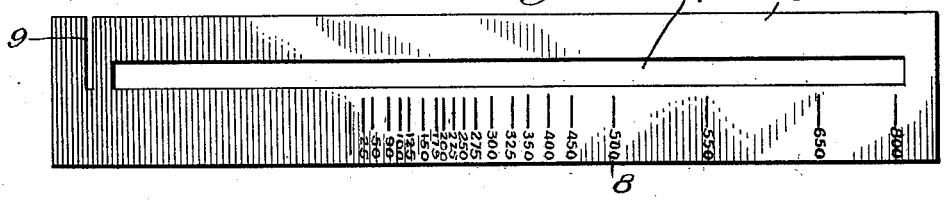

Patented Feb. 18, 1930

1,747,844

UNITED STATES PATENT OFFICE

BENJAMIN D. RITHOLZ, OF CHICAGO, ILLINOIS, ASSIGNOR TO NATIONAL WATCH & JEWELRY CO., OF CHICAGO, ILLINOIS, A CORPORATION OF ILLINOIS

EYE-TESTING DEVICE

Application filed April 16, 1927. Serial No. 184,257.

This invention relates to devices for testing eyesight and its object is to provide a novel device of simple construction which can be packed flat for mailing and which can be set up and used by any person to determine the information necessary to enable an optician to make the proper lenses for correcting defects of sight.

And a further object is to provide an eye testing device which can be made of cardboard or other material, in a convenient form suitable for mailing, and at low cost so that one may be furnished without charge to any customer for testing his own eyes.

In the accompanying drawings illustrating a selected embodiment of the invention:

Fig. 1 is a perspective view of the device.

Fig. 2 is a front elevation and Fig. 3 is a vertical sectional view of the eye member.

Fig. 4 is a front elevation and Fig. 5 is an edge view of the chart member.

Fig. 6 is a plan view of the connecting scale member.

Referring to the drawings the connecting member 6 consists of an elongated narrow strip having a longitudinal slot 7. A graduated scale 8 is printed on the connecting member below the slot. A transverse slit 9 extends from the upper edge of the connecting member to a point about the middle of the connecting member and this slit is located between the end of the slot and the front end of the connecting member.

An eye member 10 has an opening 11 over which a lens 12 is suitably secured, as by a ring 13 having clips 13'. An extension 14 at the left side of the eye member is partly separated from the main body part of said member by a slit 15 which extends upward from the lower edge of the extension to a point opposite the lens. The lower part of the eye member is formed into a handle or finger piece 16.

The chart member 17 has an extension 18 at the left side of the main body part and it is partly separated from the main body part by a top slit 19 which extends down from the top edge of the chart member, and a bottom slit 20 which extends up from the bottom edge of the extension. These slits 19, 20 are in alignment and they are separated by a neck 21 which is approximately as long as the width of the slot 7 in the connecting member. A chart 22 is printed on the front of the chart member and the lower end of the member is formed into a handle or finger piece 23.

The several members may be made of cardboard, or other suitable material, and they are detached for convenience in packing and shipping and are adapted to be easily and quickly assembled for use. The eye member is mounted in fixed position on the connecting member, at right angles thereto, by engaging the slot 15 with the slot 9 and pushing the eye member down on the connecting member until the upper end wall of slot 15 is seated against the bottom end wall of slot 9 with the main body part of the eye member on the right side and its extension on the left side of the connecting member. By this simple means the eye member is firmly mounted on the connecting member and projects like a wing at one side thereof.

The chart member is placed in a horizontal position and its extension is projected through the slot 7, after which the chart member is uprighted, with its neck in upright position in the slot 7, its slit 19 engaged with that part of the connecting member above the slot and its slit 20 engaged with that part of the connecting member below the slot. The chart member is held in upright position at right angles to the connecting member with its main body part on the right side and its extension on the left side of the connecting member. The chart is thus positioned in a direct line with the lens and the chart member may be moved back and forth freely and easily on the connecting member, but always in parallel relation with the eye member. The scale is properly graduated so that anyone may test his own eyesight by holding the handle 16 of the eye member in his left hand to support the device with the lens to an eye, and then adjusting the chart member on the connecting member until certain parts of the chart are clearly readable, and noting the graduation on the scale.

The device is simple in construction, it can be made at such low cost of cardboard or other suitable material that any customer can be supplied with the device for his own use and without charge. The several members can be easily packed for mailing and it can be readily assembled and used without previous practice or special skill.

I have shown the device in a form which I have fully tested and used commercially with satisfactory results, but I reserve the right to make any changes in the form, construction and arrangement of parts as fall within the scope of the accompanying claim.

I claim:

A lens holder for eye testing devices, comprising a cardboard eye member having a hole therein, a stamped metal ring about said hole, a lens for said opening held between said member and said ring, and integral clips on said ring extending through said member and bent over against the member for securing the ring in place.

BENJAMIN D. RITHOLZ.